United States Patent
Suggs (10) Patent No.: US 10,606,599 B2
(45) Date of Patent: Mar. 31, 2020

(54) OPERATION CACHE

(71) Applicant: Advanced Micro Devices, Inc., Sunnyvale, CA (US)

(72) Inventor: David N. Suggs, Austin, TX (US)

(73) Assignee: ADVANCED MICRO DEVICES, INC., Sunnyvale, CA (US)

( * ) Notice: Subject to any disclaimer, the term of this patent is extended or adjusted under 35 U.S.C. 154(b) by 132 days.

(21) Appl. No.: 15/374,727

(22) Filed: Dec. 9, 2016

(65) Prior Publication Data
US 2018/0165096 A1    Jun. 14, 2018

(51) Int. Cl.
*G06F 9/38* (2018.01)
*G06F 12/0875* (2016.01)
*G06F 12/0855* (2016.01)
*G06F 12/0862* (2016.01)
*G06F 9/30* (2018.01)

(52) U.S. Cl.
CPC ............ *G06F 9/3808* (2013.01); *G06F 9/382* (2013.01); *G06F 12/0855* (2013.01); *G06F 12/0862* (2013.01); *G06F 12/0875* (2013.01); *G06F 9/30149* (2013.01); *G06F 9/3824* (2013.01); *G06F 9/3836* (2013.01); *G06F 2212/1024* (2013.01); *G06F 2212/452* (2013.01); *G06F 2212/6028* (2013.01)

(58) Field of Classification Search
None
See application file for complete search history.

(56) References Cited

U.S. PATENT DOCUMENTS

| | | | |
|---|---|---|---|
| 5,442,760 A * | 8/1995 | Rustad | G06F 9/3806 |
| | | | 711/E12.046 |
| 5,689,672 A | 11/1997 | Witt et al. | |
| 6,012,125 A | 1/2000 | Tran | |
| 6,247,097 B1 * | 6/2001 | Sinharoy | G06F 9/3802 |
| | | | 711/125 |
| 6,266,752 B1 | 7/2001 | Witt et al. | |
| 7,856,633 B1 * | 12/2010 | Lee | G06F 9/3017 |
| | | | 711/129 |
| 2002/0144101 A1 * | 10/2002 | Wang | G06F 9/3802 |
| | | | 712/240 |
| 2004/0088489 A1 * | 5/2004 | Hironaka | G06F 9/3802 |
| | | | 711/131 |
| 2004/0268102 A1 | 12/2004 | Combs et al. | |

(Continued)

OTHER PUBLICATIONS

Solomon, B. et al., "Micro-Operation Cache: A Power Aware Frontend for Variable Instruction Length ISA", IEEE Transactions on Very Large Scale Integration (VLSI) Systems, Oct. 2003, pp. 801-811, vol. 11, No. 5, IEEE, USA.

Kanter, David, "Instruction Decode and uop Cache", Intel's Sandy Bridge Microarchitecture, Sep. 25, 2010, 2 pgs., (retrieved at: http://www.realworldtech.com/sandy-bridge/4/ on Jun. 2, 2016).

Santana, O.J. et al: "DIA: A Complexity-Effective Decoding Architecture" IEEE Transactions on Computers, IEEE, USA, vol. 58, No. 4, Apr. 2, 2009 pp. 448-462.

(Continued)

*Primary Examiner* — George Giroux
(74) *Attorney, Agent, or Firm* — Volpe and Koenig, P.C.

(57) ABSTRACT

A system and method for using an operation (op) cache is disclosed. The system and method include an op cache for caching previously decoded instructions. The op cache includes a plurality of physically indexed and tagged instructions allowing sharing of instructions between threads. The op cache is chained through multiple ways allowing service of a plurality of instructions in a cache line. The op cache is stored between a shared operation storage and immediate/displacement storage to maximize capacity.

14 Claims, 9 Drawing Sheets

(56) References Cited

U.S. PATENT DOCUMENTS

| | | | |
|---|---|---|---|
| 2005/0108508 A1* | 5/2005 | Hebda | G06F 9/28 |
| | | | 712/214 |
| 2005/0125637 A1* | 6/2005 | Dijkstra | G06F 9/30025 |
| | | | 712/221 |
| 2008/0133893 A1* | 6/2008 | Glew | G06F 9/3012 |
| | | | 712/220 |
| 2009/0249033 A1 | 10/2009 | Greenhalgh et al. | |
| 2009/0249036 A1 | 10/2009 | Rappoport et al. | |
| 2014/0025894 A1 | 1/2014 | Kwon | |
| 2014/0164711 A1* | 6/2014 | Loh | G06F 12/0862 |
| | | | 711/136 |
| 2014/0331013 A1* | 11/2014 | Ishii | G06F 12/084 |
| | | | 711/145 |
| 2016/0098279 A1 | 4/2016 | Glew | |
| 2016/0299849 A1* | 10/2016 | Herdrich | G06F 12/0895 |
| 2017/0199739 A1* | 7/2017 | Kitchin | G06F 12/0875 |

OTHER PUBLICATIONS

Smotherman, M. et al: "Improving CISC Instruction Decoding Performance Using a Fill Unit", Microarchitecture, 1995, Proceedings of the 28th Annual International Symposium on Ann Arbor, MI, USA, Nov. 29-Dec. 1, Los Alamitos, CA, USA, IEEE Comput. Soc. US, Nov. 29, 1995, pp. 219-229.

Intrater, G. et al. "Decoded Instruction Cache for Variable Instruction-Length Computers" Proceedings of the conference of Electrical and Electronics Engineers in Israel. Tel Aviv, Mar. 7-9, 1989; vol. Conf. 16, pp. 1-4.

Murray J et al. "Micro-architecture of the VAX 9000", Compcon Spring '90: Thirty-Fifth IEEE Computer Society International Conference Intellectual Leverage; Feb. 26-Mar. 2, 1990; San Francisco, CA, IEEE Comput. Soc., Los Alamitos, CA, USA, vol. Conf. 35, Feb. 26, 1990, pp. 44-53.

* cited by examiner

OPERATION CACHE

BACKGROUND

Traditionally, instructions are dispatched via a pipeline with instruction cache fetch and instruction decode stages. Variable-width instructions, such as those used in x86 processors, incur considerable extra hardware complexity for high-bandwidth, multiple-instruction-per-cycle decoding compared to fixed-length instructions. This in turn requires extra pipeline stages for instruction stream parsing and decoding, and these extra stages consume extra power and cause increased latency when the pipeline has to be restarted, such as on a taken or mispredicted branch that redirects instruction fetching. This limits overall instruction bandwidth per cycle, impacting performance. It also results in more idle pipeline stages that consume power while doing no useful work until instructions from the redirect propagate down the pipeline. A need exists to bypass these extra decode stages and streamline the service of instructions in an operation (op) cache (OC).

BRIEF DESCRIPTION OF THE DRAWINGS

A more detailed understanding can be had from the following description, given by way of example in conjunction with the accompanying drawings wherein.

DETAILED DESCRIPTION

An op cache (OC) is a cache of previously-decoded instructions, specifically instructions that have been decoded from an original variable-length format to a fixed-length canonical format. The OC can serve instructions for dispatch in lieu of using the traditional instruction cache fetch and instruction decode pipeline stages. The OC serving instructions improves the instructions per cycle (IPC) count by reducing redirect pipeline latency and simplifying wider parallel instruction dispatch, increasing overall instruction bandwidth per cycle. The OC serving instructions improves power usage by avoiding the need to re-fetch and re-decode instructions, and by reducing the amount of time pipeline stages are idle on redirects. The OC provides a multitude of chaining in a set to serve an arbitrary number of instructions in a cache line. The OC enables sharing of its contents between threads by being physically indexed and tagged. The OC maximizes capacity by sharing op storage with immediate/displacement storage.

The OC contains decoded instructions in a fixed-width format. As such, the OC does not need to determine instruction boundaries, nor to pick individual instructions from a byte stream. The instructions do not need to be decomposed into their component parts (such as prefix; operation code (opcode); ModRM (a byte following the opcode that specifies an address calculation based on mode (Mod), register (R), and memory (M) variables); SIB (a byte following the opcode that specifies an address calculation based on scale (S), index (I), and base(B)); and immediate/displacement fields, for example) in using the OC.

A system and method for using an OC are disclosed. The system and method include an OC for caching previously decoded basic blocks of instructions, where a basic block of instructions starts with the target of a branch and ends with a branch instruction, and additionally, in the event such a block spans a cache line boundary, is split at such boundaries into a target basic block and one or more sequential basic blocks, an additional sequential block being formed at each successive cache line boundary that is crossed. The OC includes a plurality of physically indexed and tagged entries allowing sharing of those entries between threads. The OC is chained through multiple ways, allowing multiple OC entries to service the varying plurality of instructions within a cache line. A portion of the OC is able to store either op information or immediate/displacement values to maximize capacity.

The system and method include performing instruction fetch up to the end of the cache line or taken branch using an OC. This includes receiving a predicted fetch address of a basic block to be used as an input to a plurality of micro-tags, writing the received predicted fetch address in a decoupling queue, and determining whether the received fetch address hits on one of the plurality of micro-tags. If the fetch address hits on one of the plurality of micro-tags, the operation mode is switched to the OC mode. The fetch address is then forwarded to the op-cache queue.

The system and method include performing an OC fetch. This includes reading a fetch address from the OC queue and using it to access the OC tag array to check the OC tags so accessed for an OC hit. If the comparison returns no hit, the fetch is redirected into the instruction cache for traditional fetch processing. If the comparison returns a hit, the OC data array is read and decoded and any immediate/displacement values, ops, and micro-code entry addresses, are output. The immediate/displacement information, if present, is enqueued to an immediate/displacement queue; the op entry is enqueued to an operation queue; and any existing microcode entry-point addresses are enqueued to an entry address queue.

Figure 1:
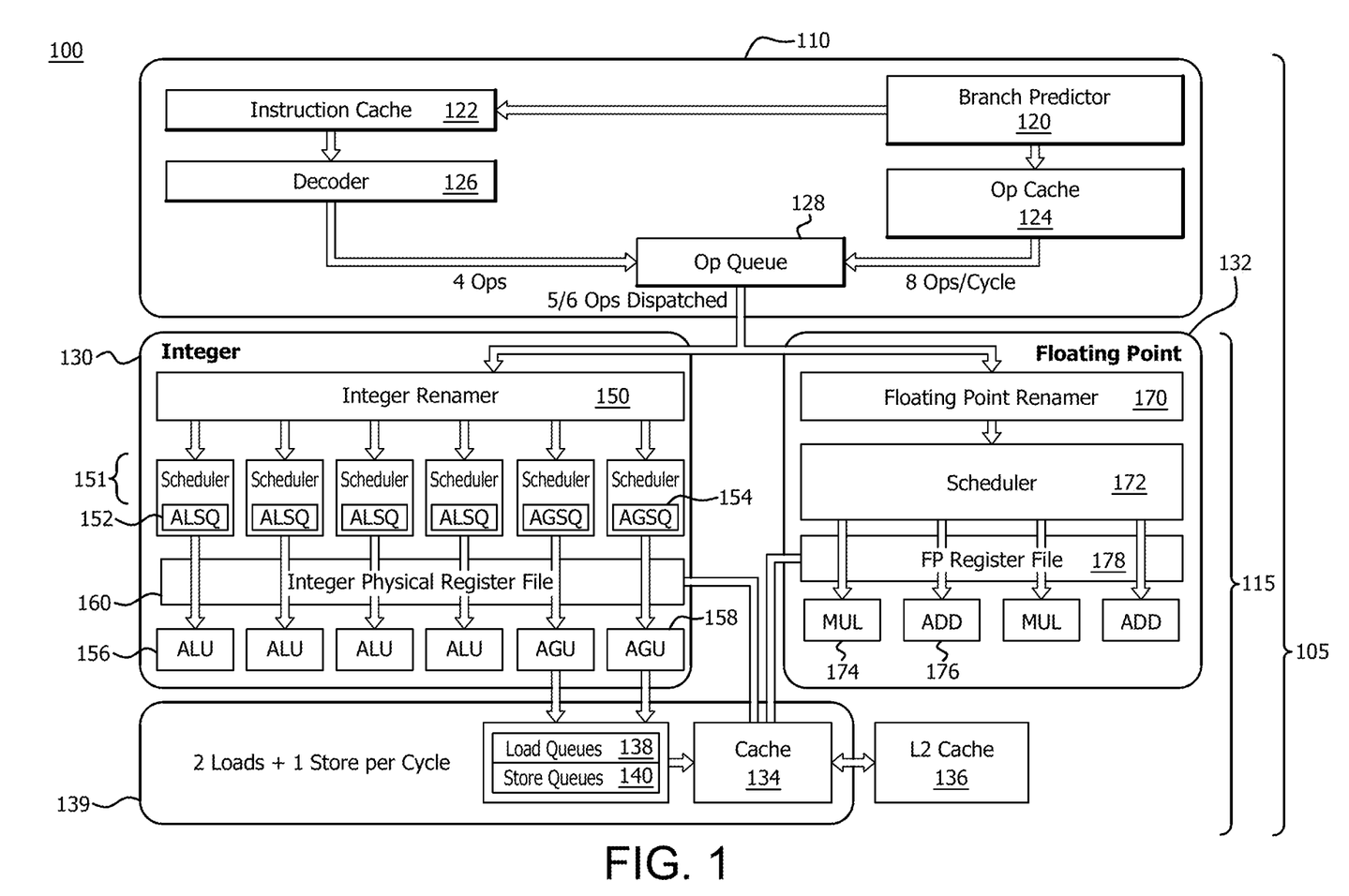
FIG. 1 illustrates a core processing unit of a processor in accordance with certain implementations.

FIG. 1 is a high level block and flow diagram of a core processing unit 105 of a processor 100 in accordance with certain implementations. The processing unit 105 includes, but is not limited to, a decoder unit 110 which provides operations (ops) to a scheduler and/or execution unit 115. The decoder unit 110 includes, but is not limited to, a branch predictor 120 connected to an instruction cache 122 and an OC 124. The instruction cache 122 is further connected to a decoder 126. The decoder 126 and the OC 124 are connected to an op queue 128.

The scheduler and/or execution unit 115 includes, but is not limited to, an integer scheduler and/or execution unit 130 and a floating point scheduler and/or execution unit 132, both of which are connected to a cache 134. The cache 134 is further connected to an L2 cache 136, load queues 138, and store queues 140. Load queues 138, store queues 140, and cache 134 are collectively referred to as a load store (LS) unit 139.

The integer scheduler and/or execution unit 130 includes, but is not limited to, an integer renamer 150 which is connected to a scheduler 151, which includes arithmetic logic unit (ALU) schedulers (ALSQs) 152 and address generation unit (AGUs) schedulers (AGSQs) 154. The scheduler 151, and in particular the ALSQs 152 and AGSQs 154, are further connected to ALUs 156 and AGUs 158, respectively. The integer scheduler and/or execution unit 130 also includes an integer physical file register 160.

The floating point scheduler and/or execution unit 132 includes, but is not limited to, a floating point renamer 170 which is connected to a scheduler 172. The scheduler 172 is further connected to multipliers 174 and adders 176. The floating point scheduler and/or execution unit 132 also includes a floating point physical file register 178.

A pipelined processor requires a steady stream of instructions to be fed into the pipeline. The branch predictor 120 predicts which set of instructions should be fetched and executed in the pipelined processor. These instructions are fetched and stored in the instruction cache 122, and when read from the instruction cache 122 are decoded into ops by the decoder 126. The OC 124 caches the ops as the decoder 126 generates them. The op queue 128 stores and queues up the ops from the decoder 126 and OC 124 for dispatching the ops for execution.

In conventional pipeline processing, an op queue dispatches certain ops, being load or store ops, directly to a load queue and/or a store queue that holds the payloads, such as control information decoded from the op, and memory addresses associated with the ops. For purposes of illustration, the store queue may accept a plurality of ops from the op queue and write the payload into the store queue at dispatch time. At address generation time, the store queue then receives a queue index from a scheduler to specify which store entry is being processed. The scheduler reads out the dispatch payload, and sends it to segmentation logic for segmentation checks, and to a load queue for a possible pick on the op pipeline. That is, conventional pipeline processing is a two pass write process with respect to the store and load queues; once at dispatch for the payload and again at address generation to generate the address in memory.

In accordance with an implementation, the ops are dispatched to the integer scheduler and/or execution unit 130 and the floating point scheduler and/or execution unit 132 only, instead of directly writing to the load queues 138 and store queues 140 as per conventional pipeline processing. In particular, the ops are directed to: (1) the scheduler 151 via the integer renamer 150; and (2) the scheduler 172 via the floating point renamer 170. The scheduler 151 holds all of the dispatch payloads for the ops (e.g., the dispatch payloads for the store ops) in the AGSQ 154. That is, the AGSQ 154 holds the ops (e.g., the load and store ops) until a queue entry in the appropriate load queues 138 and/or store queues 140 is available. Once a queue entry is available and the sources for the registers 160 are ready, the AGSQ 154 generates the address, reads the dispatch payload, and sends the dispatch payload to the load queues 138 and/or store queues 140.

In order to maintain age-ordered operation or in-order queues, every store op is associated with a particular queue entry or queue identifier. In particular, the scheduler 151 needs to know when the AGSQ 154 can perform address generation and when the scheduler 151 can send the stored data (i.e., the dispatch payload) to the store queue 140. Accordingly, a particular queue is communicated by the store queue 140 to the AGSQ 154 when the particular queue is available.

The load queues 138 and store queues 140 send the scheduler 151 (AGSQ 154 and ALSQ 152) a commit-deallocation signal so that the scheduler 151 (AGSQ 154 and ALSQ 152) can update its oldest store op store queue index to enable address generation or to send store data for younger store ops as those older store ops deallocate and free up their respective store queue entries. This can be implemented, for example, by adding an output (not shown) from the load queues 138 and store queues 140 to an input at the scheduler 151 (AGSQ 154 and ALSQ 152).

The load ops are not necessarily age-ordered and can use other techniques known to those skilled in the art to control execution order of the instructions. In an implementation, the load ops can operate similarly to the store ops.

Once address generation is performed by the AGSQs 154 and the data/dispatch payloads are stored in the load queues 138 and store queues 140 as needed, the core processing unit 105 executes the ops. The load queues 138 and store queues 140 return data for the load ops and perform writes for store ops, respectively. For other types of operations the scheduler 151 and the scheduler 172 issue ops to the integer scheduler and/or execution unit 130 and floating-point scheduler and/or execution unit 132 as their respective sources become ready.

Figure 2:
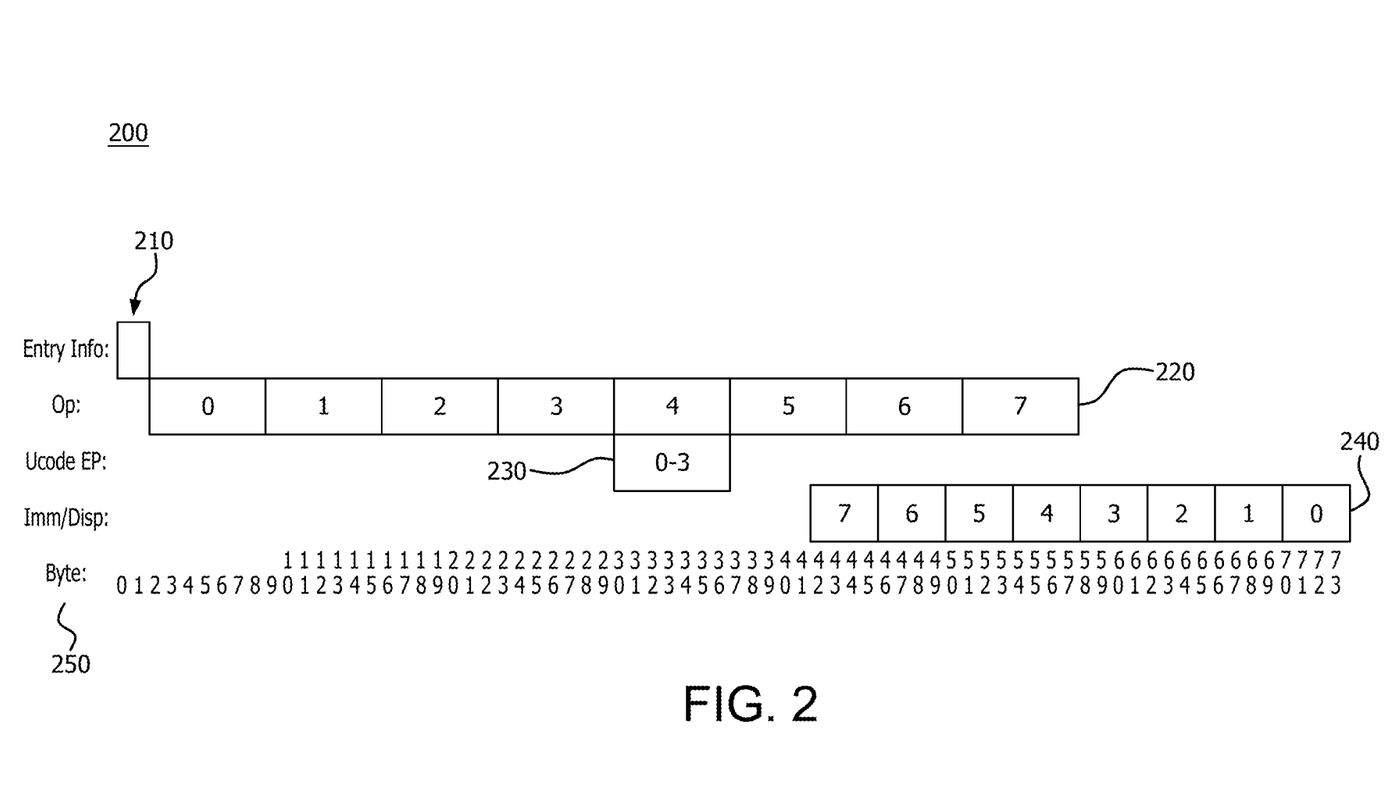
FIG. 2 illustrates an op cache (OC) entry within an op cache of the core processing unit of FIG. 1.

FIG. 2 illustrates an entry 200 within OC 124. Entry 200 is designed to hold up to 8 operations per entry for simultaneous dispatch in one clock cycle. Operationally, in an implementation, entry 200 is 74 bytes (592 total bits) allocated as shown in byte information 250, at the respective byte positions, as follows. Entry 200 includes entry information 210. Entry 200 includes storage for 8 operations 220 identified as operations 0-7 in FIG. 2. Storage for four micro-code entry points (Ucode EP) 230 corresponding to up to four micro-code instructions are utilized. As shown in FIG. 2, these micro-code EPs 230 are stored in the same position as and an alternative to operation 220 (4). In an implementation, operations 220 are 7 bytes long as shown with the bytes 250 representation. Immediate and displacement (Imm/Disp) information 240 is included within entry 200. In an implementation, Imm/Disp information 240 is formatted to start near the end of entry 200 and partially overlaps storage for operations 220, as this portion of operations 220 is less frequently used. Operation positions 5, 6 and 7 may store operations or immediate/displacement values as needed. In an implementation, Imm/Disp information 240 includes 8 4-byte entries.

OC micro-tag contents are associated with entry 200. The micro-tag array is a separate physical structure with the same indexing and ways as the entries array (data portion of the cache) and the full tags array (OC tag). Logically, the micro-tag array is considered part of the same array, but physically is separate and is utilized at a different point in the pipeline, so together they may not be considered one unified array. The micro-tag array provides a quick hint that a desired entry either may be or is not in the OC, whereas the main OC tag array provides the true indication of hit or miss. OC micro-tag contents are described in Table 1.

TABLE 1

OC Micro-Tag Contents

| Field | Width | Description |
|---|---|---|
| Valid | 1 | Tag entry valid bit. |
| Micro-Tag | 13 | Hash of physical address bits (PA[47:11] and PA[5:0]). |

OC tag contents are associated with entry 200. The tag array is a separate physical structure. The tag array includes the same indexing and ways as the entries array (data portion of the cache) and the micro-tag array (OC micro-tag). Logically, the tag array is considered part of the same array, but physically is separate and is utilized at a different stage of the pipeline, so together they may not be considered one unified array. OC tag contents are described in Table 2.

Each entry 200 has dedicated storage for up to 4, 32-bit Imm/Disp values 240. Additional Imm/Disp 240 values (up to 8 total) share bit storage with operations 220, by replacing operations 220 starting from the highest numbered operation 220 (7) and working downward (as necessary) to operation 220 (5). When needed for Imm/Disp storage, this reduces the usable number of operations 220. Because operations 220 are 56 bits and Imm/Disp information 240 is 32 bits, an entry with 8 Imm/Disp information 240 can contain a maximum of 5 operations 220. Imm/Disp information 240 that are 64 bits take two 32-bit positions as shown in Table 4.

TABLE 2

OC Tag Contents

| Field | Width | Description |
|---|---|---|
| Offset | 7 | This is the signed byte offset (−14 to 63) from the first byte of the aligned 64 B block corresponding to this entry to the start byte of the first instruction in this entry. If the first instruction starts in this 64 B block, this offset will be non-negative. If the instruction starts in the previous block and spans into this block, then this offset will be negative, pointing back into that previous block. Address offsets provided from the branch predictor to the OC are always positive and thus can only match against positive values of Offset here. Negative values of Offset will only match against instructions that span from a previous OC entry (i.e., crossing a 64 B boundary) as indicated by the SequentialBasicBlock field. |
| Tag | 37 | Physical address 47:11. |
| Cs64 | 1 | 64-bit mode (EFER.LMA & CS.L). This is used as part of the tag hit compare logic to distinguish between 32-bit mode and 64-bit mode basic blocks. This avoids having 32-bit mode fetches hit on 64-bit mode decoded instructions and vice versa. |
| TSFault | 1 | Task-switched fault. This bit is set for each entry containing any instructions that will fault when CR0.TS = 1. When CR0.TS = 1, all entries that have TSFault = 1 will miss. This causes the affected entries to flow down the traditional fetch/decode pipeline to take the fault. |
| SequentialBasicBlock | 1 | This indicates the 64 B block that contains the end byte of the next sequential instruction after the instruction corresponding to the last op in this OC entry. When SequentialBasicBlock is 0, an instruction ending in this same 64 B block is indicated. When SequentialBasicBlock is 1, an instruction ending in the next sequential 64 B block is indicated. |
| SequentialOffset | 6 | This is the byte offset from the first byte of the block indicated by the SequentialBasicBlock field to the start byte of the next sequential instruction after the instruction corresponding to the last op in this OC entry. When SequentialBasicBlock is 0, SequentialOffset is an unsigned offset within this basic block (1 to 63). When SequentialBasicBlock is 1 (next instruction either spans 64 B boundary or starts at byte 0 of next block), SequentialOffset is a signed offset relative to the first byte of the next sequential block (−14 to 0). |

Entry information 210 includes miscellaneous bits that are per entry 200 rather than per operation 220 or per Imm/Disp information 240. This entry information 210 includes information shown in Table 3.

TABLE 3

Entry Information Fields

| Field | Width | Description |
|---|---|---|
| NumOps | 4 | Number of valid ops in this entry (0 to 8). It is possible for an entry to be built with 0 valid ops in the case of a single instruction that spans into the next basic block. |
| Prty | 9 | Parity for this OC entry. |

Each entry has storage for up to 8 operations 220, numbered 0 through 7. The op is encoded as 56 bits.

TABLE 4

Imm/Disp Field

| Field | Width | Description |
|---|---|---|
| ImmDisp | 32 | Either 1 8-, 16- or 32-bit immediate value or 1 8-, 16- or 32-bit displacement value, or half of one 64-bit immediate or 64-bit displacement value. 64-bit values consume two of these fields. |

Micro-code EP 230 are designed such that when an entry contains any micro-coded instructions, only operations 220 (0-3) can contain valid operations. Operation 220 (4) is used to store 1-4 micro-code EP 230. The operations 220 (5-7) cannot contain valid operations in this case, although operations 220 (5-7) can still be used for Imm/Disp information 240 storage. This means that a maximum of 4 operations 220 can be stored in an entry containing any micro-coded instructions. A micro-coded instruction still consumes a normal operation 220 position in addition to its entry point storage. A micro-code EP 230 is 14 bits.

Figure 3:
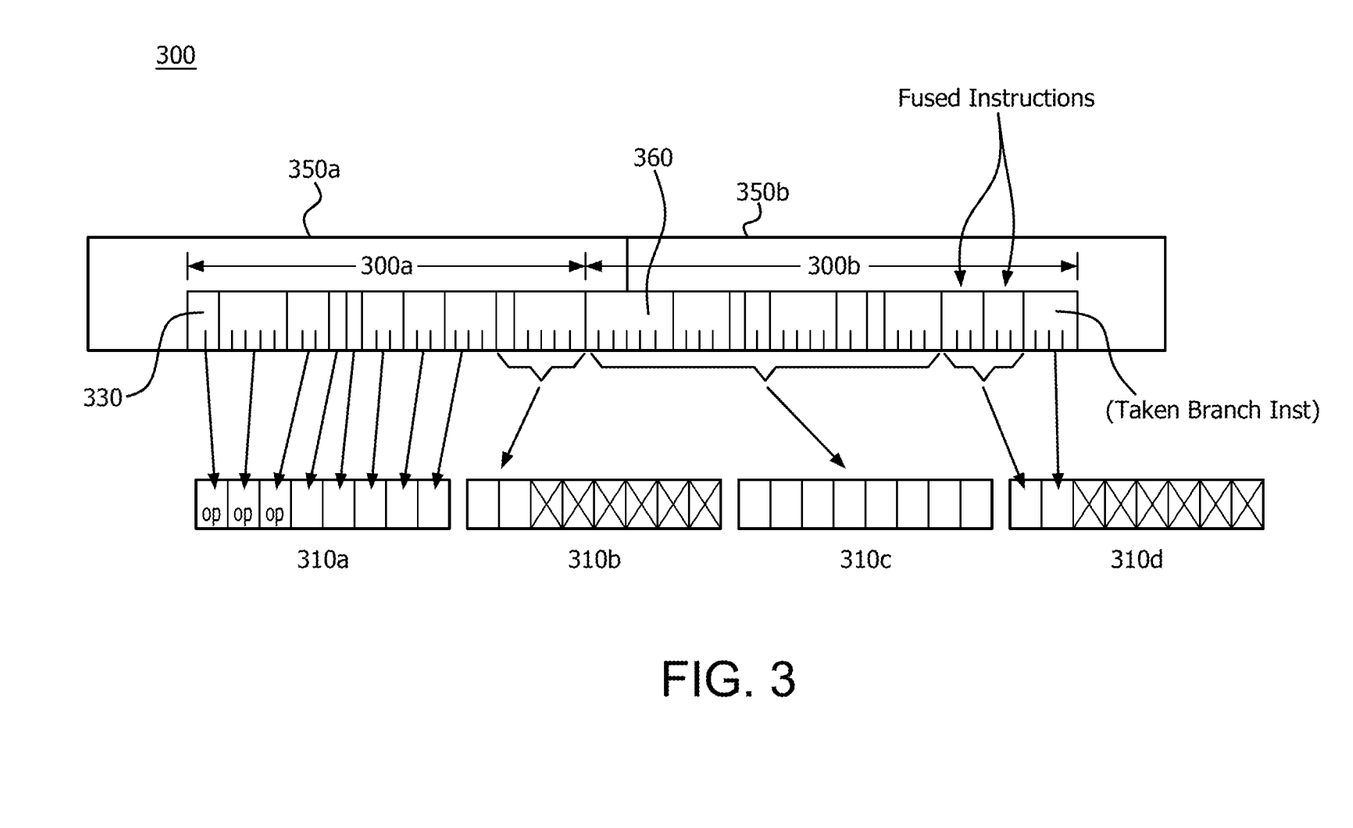
FIG. 3 illustrates a basic block of instructions split across instruction cache lines, and a plurality of associated OC entries within an op cache.

FIG. 3 illustrates an example of how OC entries conceptually line up with basic blocks in instruction cache lines. FIG. 3 shows two basic blocks 300 spanning two instruction cache lines and a plurality of associated OC entries 200. Here, basic blocks 300 include four OC entries 310*a,b,c,d*. The OC entries 310*a,b,c,d* are aligned within two cache lines 350*a,b*. The first OC entry 310*a* corresponds to the beginning of a basic block that starts at a branch target 330. It contains the 8 decoded instructions of that basic block. Once first OC entry 310*a* is complete (illustrated as being contained completely within the first cache line 350*a*), the second OC entry 310*b* is stored. The instructions for OC entry 310*b* are also contained within the first cache line 350*a*. In this case only two instructions remain in the cache line, therefore using only two ops in OC entry 310*b* with the rest of the op storage remaining empty. Once OC entry 310*b* is complete (illustrated as being contained completely with the first cache line 350*a*), the third OC entry 310*c* is stored. Third OC entry 310*c* starts with the last instruction in cache line 350*a*, which happens to cross the 64B boundary into cache line 350*b*. This instruction takes the first op position in OC entry 310*c*, and the following (up to 7) instructions in cache line 350*b* fill out the rest of the ops in OC entry 310*c*. In a fashion similar to the completion of first OC entry 310*a* and second OC entry 310*b*, once third OC entry 310*c* is complete (illustrated as being in both first cache line 350*a* and second cache line 350*b*), the fourth OC entry 310*d* is stored. As illustrated, fourth OC entry 310*d* is contained within second cache line 350*b*. It may end with a taken branch or the last instruction fully contained within cache line 350*b*, or for the purpose of illustration only ends with a taken branch.

The two basic blocks 300 include a first basic block 300*a* and a second basic block 300*b* (collectively referred to as basic blocks 300). Basic blocks 300 are contained entirely within two adjacent cache lines 350. Any of the basic blocks 300 can be a certain maximum size and alignment. As illustrated and discussed in the present implementation, this size and alignment correspond to a cache line of 64B. One of the basic blocks 300 starts at the beginning of the cache line (in the case of a sequential walk into the cache line) or at a taken branch target. One of the basic blocks 300 ends either at the end of the cache line (sequential walk out) or at the last byte of a taken branch instruction. In an implementation, a cache line 350 is a 64B aligned memory region.

The first two OC entries 310*a,b* are in the first basic block 300*a*. The second two OC entries 310*c,d* are in the second basic block 300*b*. For the case of an instruction that spans basic blocks (i.e., instructions are multiple bytes) like the first instruction 360 of the third OC entry 310*c*, there is some leeway as to which entry and basic block that instruction is associated with. In an implementation, instructions that span cache lines are associated with the cache line (basic block) containing the instruction's end byte (in FIG. 3, OC entry 310*c* is associated with basic block 300*b*). That means that an entry that contains a cache-line-spanning instruction will always have that instruction as the first instruction in the entry.

In an implementation, one of the basic blocks 300 spans an arbitrary number of OC entries 310. In an implementation, arbitrary spanning of OC entries 310 by a basic block occurs by chaining using the SequentialOffset field of the tags with the chaining endpoint at a predicted taken branch. The SequentialOffset and SequentialBasicBlock fields also support the chaining of the last OC entry in a basic block to the first OC entry in a sequential basic block. In this manner the chaining of OC entries can span multiple basic blocks.

Also illustrated in FIG. 3 is a fused instruction. This fused instruction will be discussed below.

Figure 4:
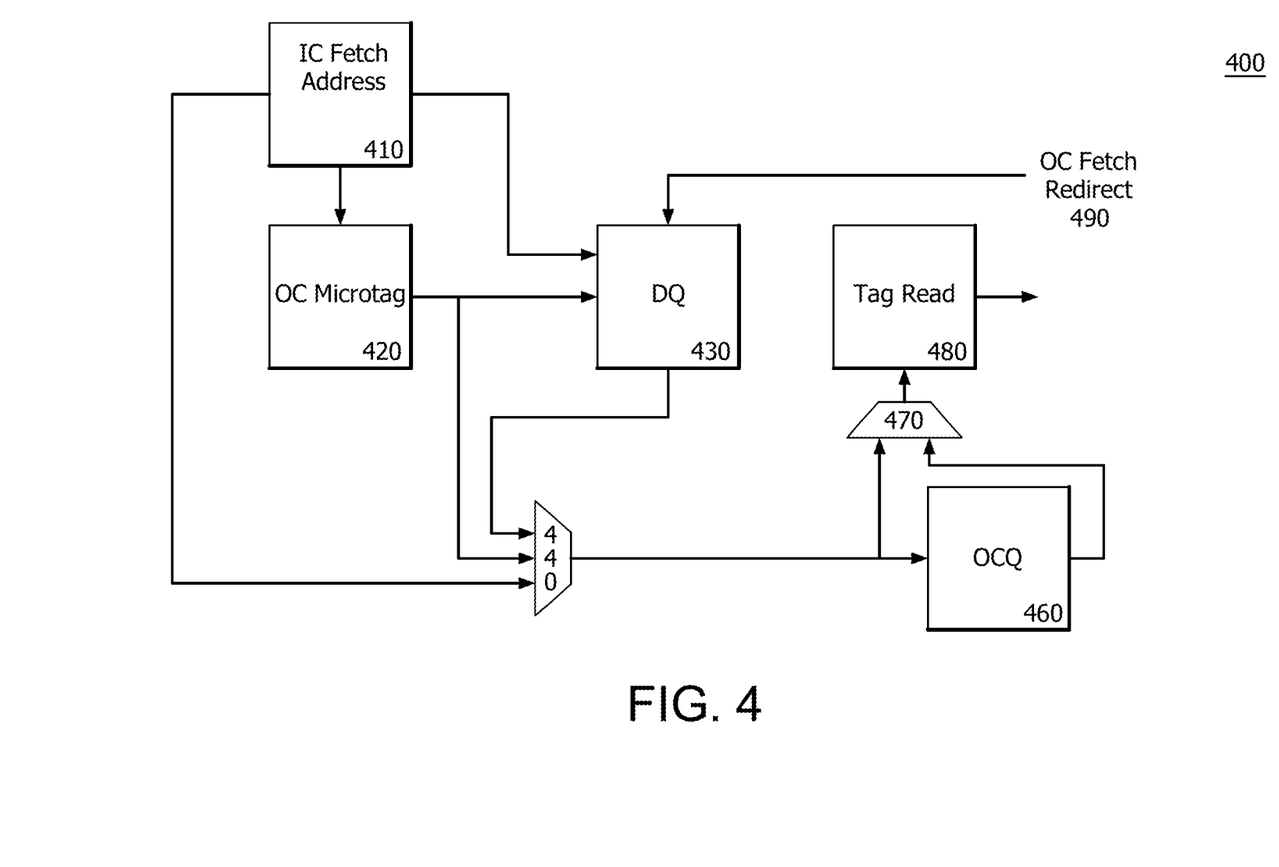
FIG. 4 illustrates a flow diagram of the process of an instruction cache, branch prediction, and OC pipeline.

FIG. 4 illustrates a flow diagram of a process 400 of an OC pipeline. Process 400 provides the transition of the pipeline from the instruction cache (IC) mode into the op-cache mode. At reset, the pipeline is in the IC mode. That is, a fetch is performed via the instruction cache. In the IC mode, all fetches are delivered down the traditional instruction cache fetch and decode pipeline. According to an implementation, process 400 is utilized to determine if the micro-tag is a hit allowing the fetch to be serviced via the OC pipeline in the OC mode.

Process 400 begins taking or receiving a fetch address that is used to check against the OC micro-tags. OC micro-tag 420 utilizes the fetch address to predict if there will be a hit in the OC cache. The fetch address is provided to decoupling queue (DQ) 430 and input to DQ-bypass multiplexer (MUX) 440. DQ 430 decouples the branch prediction (BP) pipeline from the instruction cache (IC) pipeline (not shown) and the OC pipeline, allowing fetch requests to queue up when the active pipeline stalls. DQ 430 receives the fetch address and is provided the OC fetch redirect 490, and outputs to DQ bypass MUX 440. If the physical fetch address hits in the micro-tags, the mode is switched to the op-cache mode. This matching is only done for branch target fetches and redirect target fetches because those are the only times when an instruction start position is known in the fetch pipeline.

Once the information from OC micro-tag 420 and DQ 430 is received at MUX 440 and a hit is determined, the instruction cache to op-cache mode transition occurs. The op-cache remains stalled until the traditional fetch and decode pipeline is empty. Once the traditional fetch and decode pipeline is empty, it unstalls and begins to deliver operations to the operation queue (OPQ) no earlier than the cycle after the last operations are delivered from the decode pipeline.

Given a transition to op-cache mode, the op-cache queue (OCQ) 460 and MUX 470 then receive the physical fetch address from MUX 440. OCQ 460 allows fetch requests to be queued up when the OC pipeline is stalled, and provides the outputed queued fetch address to OCQ-bypass multiplexer (MUX) 470.

The fetch addresses are then read from the OCQ 460 or, if the OCQ 460 is empty, bypassed around the OCQ 460 as new addresses arrive, and used for the OC tag array lookup in Tag Read 480. One set of the tag array is read using a set index consisting of physical address bits 10:6, and the tag addresses for each of the 8 ways in the set are compared against the fetch address. If the address in one of the 8 ways matches the fetch address (along with other qualifications, included hereinabove in Table 2), the OC is hit, and the fetch continues processing in the OC pipeline. If the addresses do not match, the OC is a miss and an OC fetch redirect 490 is signaled (this is described in more detail in connection with FIG. 5, particularly Tag Cmp 520).

Figure 5:
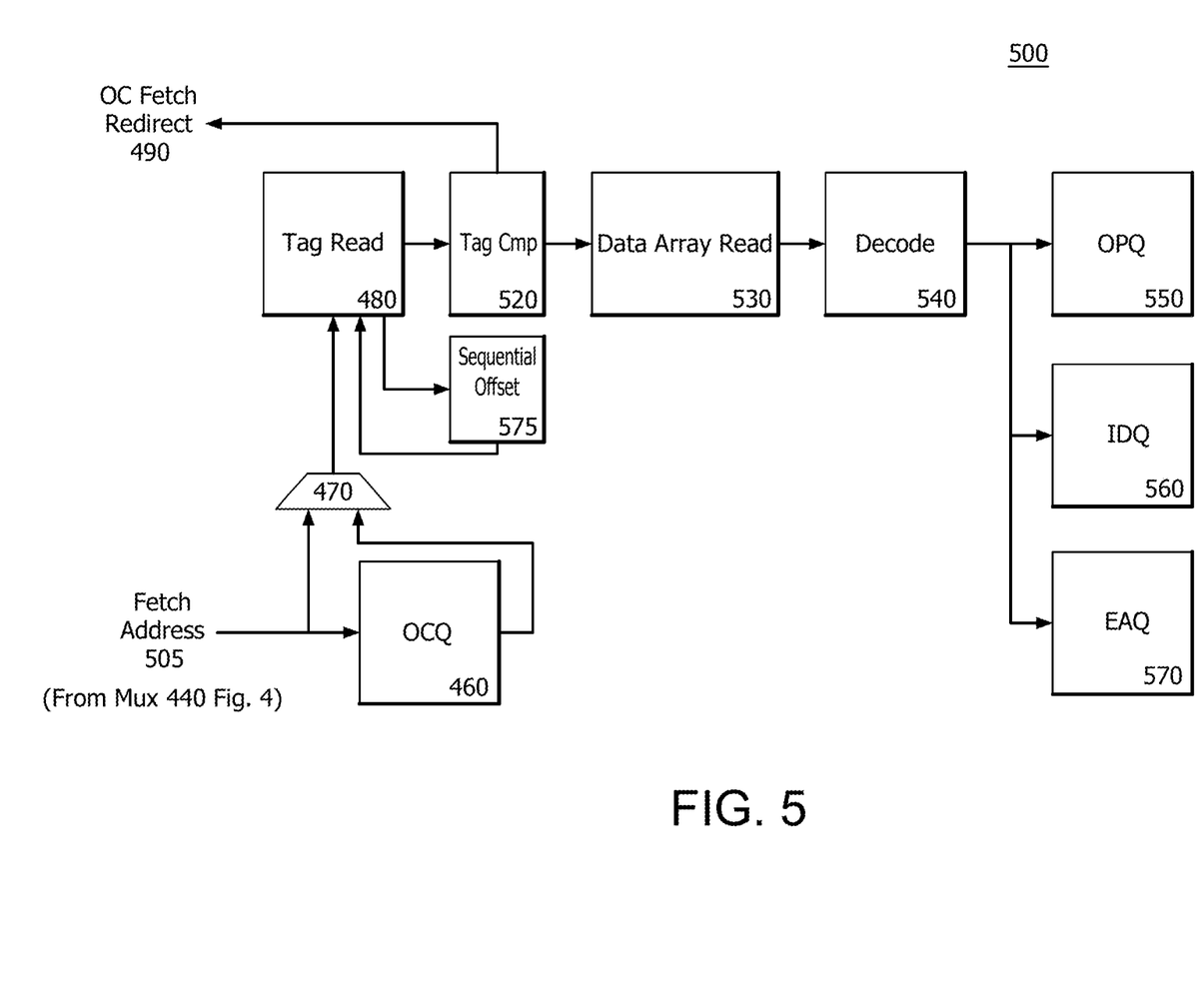
FIG. 5 illustrates a flow diagram of the process of the op fetch pipeline.

FIG. 5 illustrates a flow diagram of a process 500 of an OC fetch pipeline. Process 500 begins by receiving the fetch address 505 and providing the address as an input to OCQ 460 and OCQ bypass MUX 470 as described above with respect to FIG. 4. OCQ 460 provides storage for fetch addresses that are received when the OC pipeline is stalled, decoupling the OC pipeline from the fetch generation logic. MUX 470 selects fetch address 505 if there are no fetch addresses pending in the OCQ 460, else it selects the next pending address in the OCQ 460 and outputs it to tag read 480 which outputs the selected tags into the OC tag comparison 520, along with the fetch address. A sequential offset 575 is configured in a loop with tag read 480 to provide chaining of sequential OC entries.

In op-cache mode, the IC no longer reads IC micro-tags, and while it read op-cache micro-tags, this is only for determining valid way(s) and not for determining an overall hit/miss or steering between the OC and IC pipelines. The IC fetch generation logic delivers sequential and branch target fetches to the OC pipeline until it receives a redirect from the OC pipeline, at which point the IC mode is entered and the fetch is delivered down the traditional instruction cache and decode pipeline. This allows the OC pipeline to control when to switch back into IC mode, and it also ensures that there are no uncommitted ops in the OC pipeline after the mode switch that might otherwise be written into the OPQ 550 after new IC mode decode pipe writes.

The selected tag is compared against the fetch address in tag compare (cmp) 520. If there is not a hit, the OC redirects the fetch to the IC via OC Fetch Redirect 490 and the mode is switched back to IC mode. If there is a hit determined by the comparison made in tag cmp 520, tag cmp 520 outputs an OC data array address to data array read 530. Data array read 530 outputs the accessed OC entry containing up to 8 ops to decode 540. Decode 540 performs some simple decode of the ops and other information in the OC entry and provides output to operation queue (OPQ) 550, immediate/displacement queue (IDQ) 560, and entry address queue (EAQ) 570. OPQ 550 queues the ops to be dispatched. IDQ 560 is an immediate/displacement queue, and EAQ 570 is a micro-code entry point queue, which is discussed above.

OPQ 550 is a queue that feeds dispatch into the register renaming part 150, 170 of the machine pipeline. In general, such queues decouple sections of the pipelines. OPQ 550 decouples the op cache pipeline or traditional decode pipeline (depending upon the operation mode) stages from the dispatch pipeline stages. This decoupling allows the op cache or traditional decode pipeline to produce ops and have storage for the produced ops without regard for whether a downstream pipeline stage (in this case, the dispatch stage) is able to advance or not.

Redirects and resyncs take priority over the normal mode transitions, above with respect to FIG. 5. Redirect target fetches are matched against OC micro-tags as described above, and a match causes a transition into op-cache mode whereas a mismatch causes a transition into IC mode at the redirect address. Resync target fetches sometimes force a transition into IC mode. This ensures that instructions that are fused in the OC (see below) are decoded and dispatched as separate instructions for proper exception handling.

In an implementation, certain adjacent instructions, for example a compare instruction followed by a branch instruction, may be combined, or fused, into a single operation for increased efficiency. In such cases, the OC build logic creates a single OC entry that covers both instructions, as shown generally in FIG. 3 as fused instructions.

Figure 6:
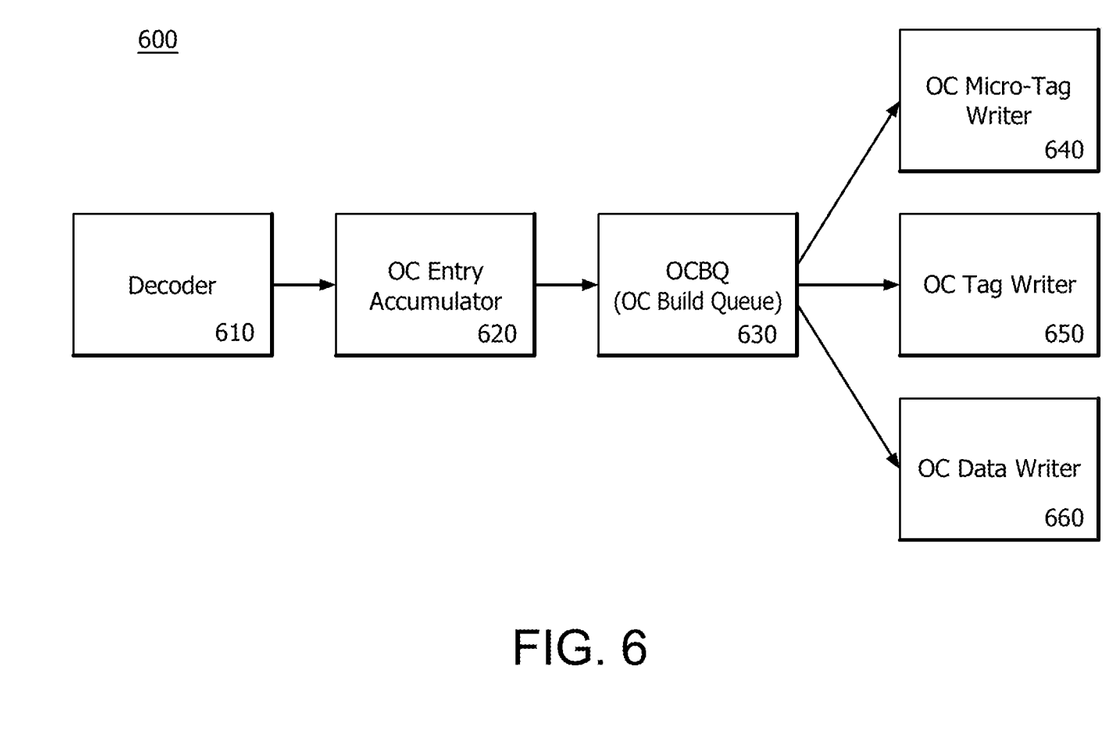
FIG. 6 illustrates a flow diagram of the process of an OC build pipeline.

FIG. 6 illustrates a flow diagram of a process 600 of an OC build pipeline, which is an extension of the traditional decode pipeline. The process 600 installs sequences of decoded instructions into the OC. During a build, decoded instructions are accumulated until the earliest of: (1) an 8th operation is acquired, (2) an 8th Imm/Disp is acquired, (3) a collision between operation and Imm/Disp shared space would occur, (4) a 4th operation if there are any micro-coded instructions, (5) an instruction that extends past the end of the cache line is encountered, (6) a predicted-taken branch instruction is encountered, or (7) more than two instructions with associated branch predictions are encountered.

Fetch addresses provided to the OC are either branch target addresses or sequential fetch addresses, the latter pointing to successive 64B blocks. When the fetch window contains a predicted-taken branch instruction, the fetch address is accompanied by a fetch window termination offset which locates the last byte of this instruction within the cache line. During the OC entry build process, this fetch window termination offset indicates where the build should stop. During the OC fetch process this indicates the last op to be sent to the OPQ. If the OC entry had been built when the branch was not predicted taken, this will cause an intermediate exit point which terminates op dispatch at an earlier op position than would otherwise be indicated by the EntryInfo 210 NumOps field.

If an OC entry is built with a first branch that is conditional and predicted taken, then when the entry is later fetched from the OC, it is possible to generate a miss if the conditional branch is predicted not taken because sequential instructions after the branch are needed but not present in the OC entry. In that case, the fetch is redirected to the IC for traditional processing in order to generate the ops for the fall-through path, and a new OC entry is started for this path with a starting point of the first instruction after the branch.

Process 600 illustrates the building of the op cache entries. In process 600, decoder 610 (the traditional decoder in the IC fetch pipeline) outputs up to 4 decoded instructions (ops) and (when present) associated imm/disp values per cycle and/or micro-code entry points to OC entry accumulator 620. OC entry accumulator 620 outputs assembled OC entry contents and associated fetch addresses to OC build queue (OCBQ) 630. OCBQ 630 in turn outputs the entry and tags to OC micro-tag writer 640, OC tag writer 650, and/or OC data writer 660 for writing to the OC micro-tag array, OC tag array, and OC data array, respectively. OCBQ 630 provides buffering for several OC entries and tags until they can be written to their OC storage locations.

In an implementation, in order to save power and improve hit rate, the OC builds only frequently-used cache lines. An instruction cache access count is used as a build qualifier.

The access count is zero for the fetch corresponding to a demand or prefetch request that was satisfied from the memory hierarchy above the instruction cache (i.e., a request that missed in the instruction cache). The access count is one for every subsequent fetch that hits in the instruction cache. This implementation of access count (saturating at 1) does not require any storage in instruction cache tags, instead relying on knowledge of whether the fetch hit or missed in the instruction cache.

As a further simplification, in an implementation, an instruction cache tag hit is used as a proxy for the access count (a tag miss corresponds to an access count of zero, and a tag hit corresponds to an access count of one). The accuracy of this technique is high except for the case of instruction cache tag aliasing due to using a subset of tag information.

In an implementation, a scheme of actually implementing one or more count bits associated with each instruction cache line is used, which costs tag bits.

When fetch is in the IC mode, the OC pipeline can enter the build mode. Build mode is started and stopped based upon operations being delivered from the decode pipeline as indicated above.

In an implementation, building of ops begins when an instruction is fetched in the IC mode and it is a branch target, decode redirect target (not including resyncs), or OC redirect target and its corresponding cache line meets the instruction cache access count build qualification.

In an implementation, building of ops stops when fetch switches to the OC mode, an instruction's corresponding cache line does not meet the instruction cache access count build qualification, the instruction is a resync target, the processor's operating mode changes in a way that impacts instruction decode, an illegal or incomplete instruction is detected, or an invalidating probe hit on instructions that are in flight in the build pipeline.

Figure 7:
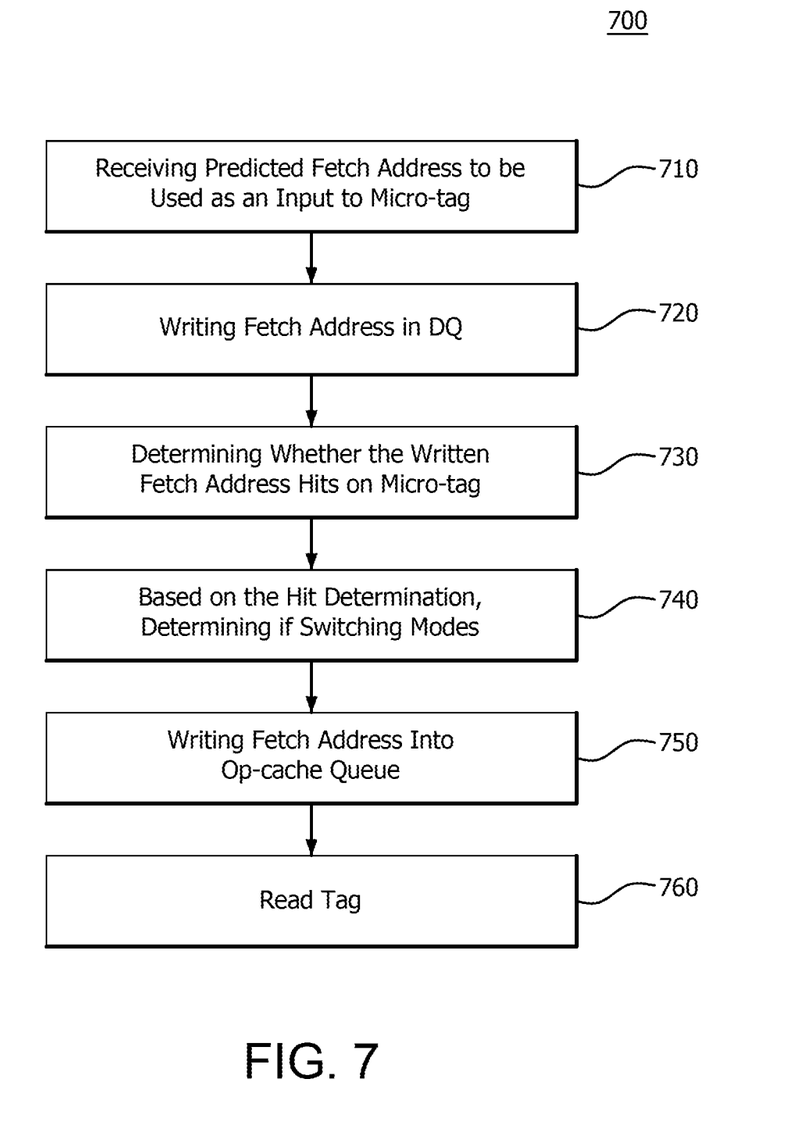
FIG. 7 illustrates a method of performing the instruction cache, branch prediction, and OC pipeline of FIG. 4.

FIG. 7 illustrates a method 700 of performing instruction fetch up to the end of the cache line or taken branch using an OC. Method 700 receives a predicted fetch target address to be used as an input to the micro-tag at step 710. At step 720, the predicted fetch address is written in the DQ. At step 730, it is determined whether the predicted fetch address hits on a micro-tag (optional in IC mode). At step 740, a determination is made if modes need to be switched (IC/OC) based on the determination of step 730. At step 750, the fetch address is written into the op-cache queue if switching to, or remaining in, the OC mode. At step 760, the tag is read from the OC tag array.

Figure 8:
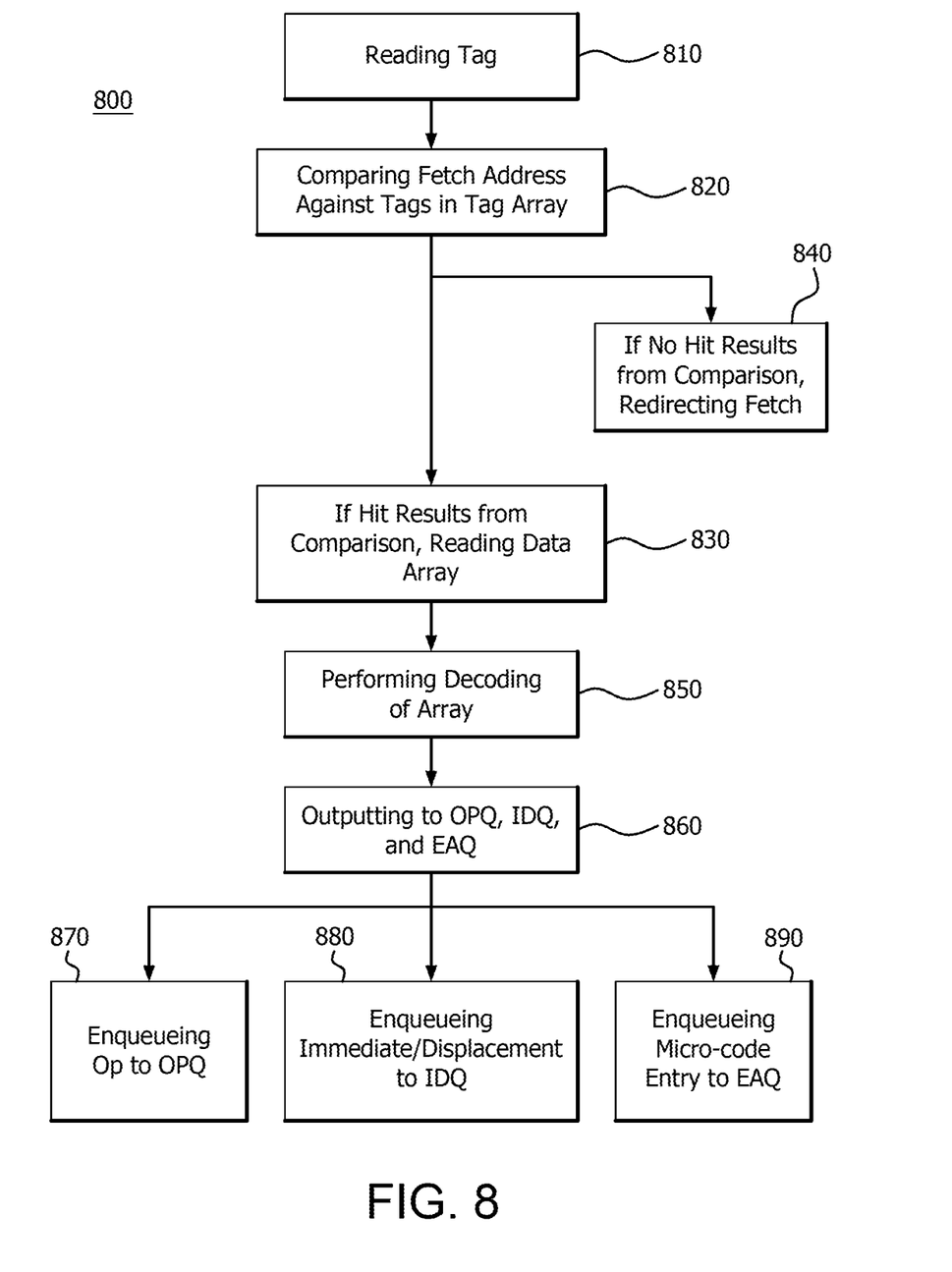
FIG. 8 illustrates a method of performing the OC fetch pipeline of FIG. 5.

FIG. 8 illustrates a method 800 of performing the OC fetch pipeline of FIG. 5. Method 800 includes reading the tag from the OC tag array at step 810. At step 820, the fetch address is compared against the tags in the tag array (8 way). At step 830, if there is a hit in the comparison of step 820, the data array is read. If there is not a hit in step 820, at step 840, OC fetch redirect occurs and method 800 returns to step 710 of method 700.

After the data array is read in step 830, relatively simple decoding is performed on the data array output (the accessed OC entry) at step 850. At step 860, outputs to OPQ, IDQ and EAQ are made. At step 870, the op is enqueued to the OPQ. At step 880, immediate/displacement value are enqueued to the IDQ. At step 890, the micro-code entry is enqueued to the EAQ.

Figure 9:
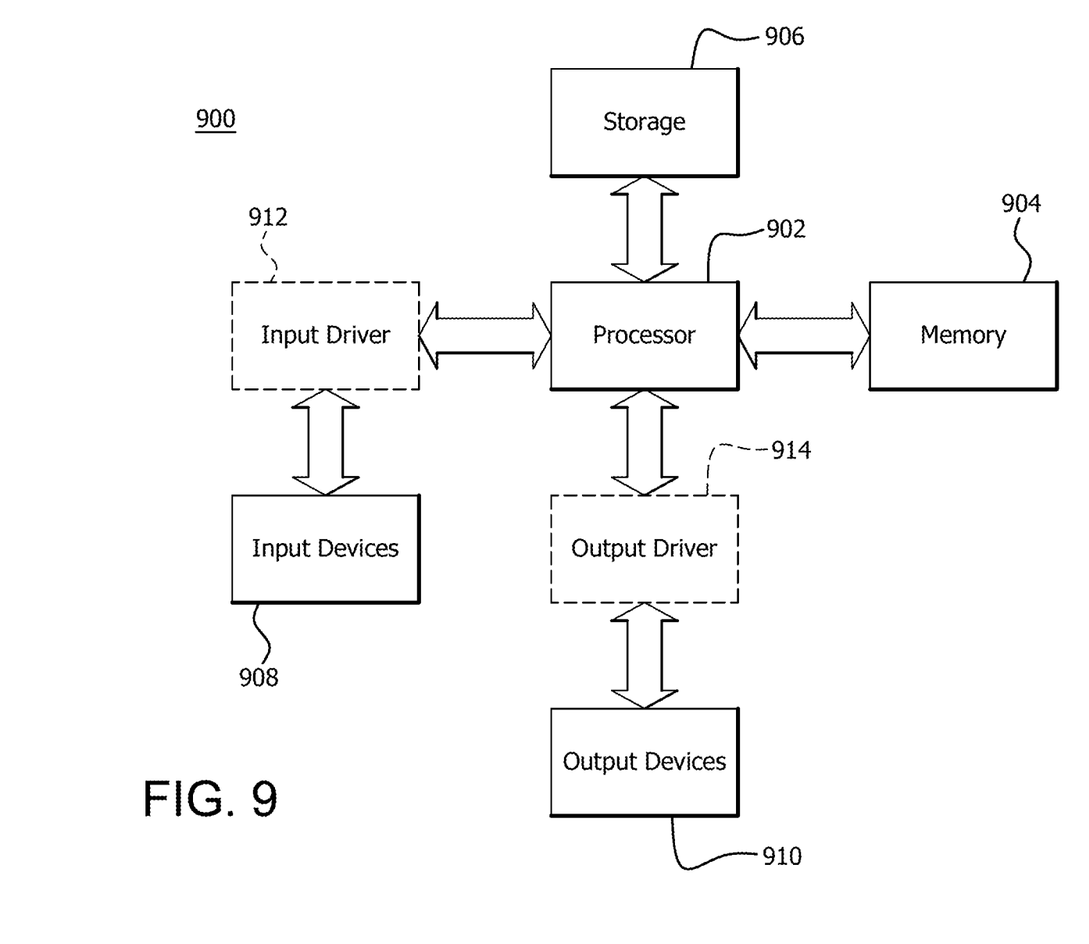
FIG. 9 is a block diagram of an example device in which one or more disclosed embodiments can be implemented.

FIG. 9 is a block diagram of an example device 900 in which one or more disclosed embodiments can be implemented. The device 900 can include, for example, a computer, a gaming device, a handheld device, a set-top box, a television, a mobile phone, or a tablet computer. The device 900 includes a processor 902, a memory 904, a storage 906, one or more input devices 908, and one or more output devices 910. The device 900 can also optionally include an input driver 912 and an output driver 914. It is understood that the device 900 can include additional components not shown in FIG. 9.

The processor 902 can include a central processing unit (CPU), a graphics processing unit (GPU), a CPU and GPU located on the same die, or one or more processor cores, wherein each processor core can be a CPU or a GPU. The memory 904 can be located on the same die as the processor 902, or can be located separately from the processor 902. The memory 904 can include a volatile or non-volatile memory, for example, random access memory (RAM), dynamic RAM, or a cache.

The storage 906 can include a fixed or removable storage, for example, a hard disk drive, a solid state drive, an optical disk, or a flash drive. The input devices 908 can include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 910 can include a display, a speaker, a printer, a haptic feedback device, one or more lights, an antenna, or a network connection (e.g., a wireless local area network card for transmission and/or reception of wireless IEEE 802 signals).

The input driver 912 communicates with the processor 902 and the input devices 908, and permits the processor 902 to receive input from the input devices 908. The output driver 914 communicates with the processor 902 and the output devices 910, and permits the processor 902 to send output to the output devices 910. It is noted that the input driver 912 and the output driver 914 are optional components, and that the device 900 will operate in the same manner if the input driver 912 and the output driver 914 are not present.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements aspects of the embodiments.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method of performing instruction fetch up to an end of a cache line or a taken branch using an operation cache (OC), the method comprising:

receiving a predicted fetch address of the OC and comparing the received predicted fetch address to a plurality of micro-tags;

writing the received predicted fetch address in a decoupling queue;

if the written fetch address hits on one of the plurality of micro-tags, writing the fetch address into an op-cache queue; and reading a tag associated with the fetch address.

2. The method of claim 1 wherein the OC is chained through multiple ways allowing service of a plurality of instructions in a cache line.

3. The method of claim 1 wherein the OC includes data stored in a single store including operation and immediate/displacement caches.

4. The method of claim 1 wherein the OC includes data stored in separate stores in operation and immediate/displacement caches.

5. The method of claim 1 wherein the OC includes data stored in a single store that contains operation and immediate/displacement data.

6. The method of claim 5 wherein the single store includes operation storage and immediate/displacement storage.

7. The method of claim 5 wherein the single store includes operation storage and micro entry point storage.

8. A method of performing an operation cache (OC) fetch, the method comprising:

reading a tag;

comparing a fetch address of the read tag against tags in a tag array and writing the fetch address into an op-cache queue;

if the comparison returns no hit in the tag array, redirecting the fetch into an instruction cache;

if the comparison returns a hit in the tag array, reading a data array associated with the tag that hit in the tag array, wherein the data array includes an immediate/displacement entry, operation entry, and micro-code entry;

decoding the read data array;

outputting the immediate/displacement entry, operation entry, and micro-code entry decoded from the read data array;

enqueueing the immediate/displacement entry to an immediate/displacement queue;

enqueueing the operation entry to an operation queue; and enqueueing the micro-code entry to an entry address queue.

9. The method of claim 8 wherein the OC is chained through multiple ways allowing service of a plurality of instructions in a cache line.

10. The method of claim 8 wherein the OC includes data stored in a single store including operation and immediate/displacement caches.

11. The method of claim 8 wherein the OC includes data stored in separate stores in operation and immediate/displacement caches.

12. The method of claim 8 where the OC includes data stored in a single store that contains operation and immediate/displacement data.

13. The method of claim 12 wherein the single store includes operation storage and immediate/displacement storage.

14. The method of claim 12 wherein the single store includes operation storage and micro entry point storage.

* * * * *